United States Patent

Palm

[11] 4,206,657
[45] Jun. 10, 1980

[54] POWER DRIVEN TOOL HAVING A RECIPROCATING SHAFT ARRANGEMENT AND METHOD OF ASSEMBLY

[75] Inventor: Bernhard Palm, Fallston, Md.

[73] Assignee: Black & Decker Inc., Newark, Del.

[21] Appl. No.: 843,571

[22] Filed: Oct. 19, 1977

[51] Int. Cl.² .............................................. F16H 21/18
[52] U.S. Cl. ...................................... 74/50; 403/272
[58] Field of Search ................ 403/272, 271; 228/170; 74/50

[56] References Cited

U.S. PATENT DOCUMENTS

| | | | |
|---|---|---|---|
| 3,055,097 | 9/1962 | Douglas | 403/272 |
| 3,204,470 | 9/1965 | Brucker | 74/50 |
| 3,751,792 | 8/1973 | Frakes | 228/170 |
| 3,945,120 | 3/1976 | Ritz | 74/50 |

Primary Examiner—Albert W. Davis
Assistant Examiner—Wesley S. Ratliff, Jr.
Attorney, Agent, or Firm—Walter Ottesen; Leonard Bloom; Edward D. Murphy

[57] ABSTRACT

The invention is directed to a power driven tool for reciprocating a cutting element such as a saw-blade or the like and includes a motor housing and a drive motor mounted in the motor housing. A gear case is connected to the motor housing and the shaft arrangement is mounted in the gear case. The shaft arrangement includes a shaft slideably mounted in the gear case for reciprocating movement. The shaft is adapted to receive the cutting element thereon. A U-shaped channel yoke is mounted to the drive shaft in such a manner that the walls of the drive shaft laterally support the U-shaped channel yoke at the base of the yoke. An eccentric drive connects the U-shaped channel yoke with the drive motor for reciprocating the shaft arrangement.

A method of assembling the shaft arrangement includes the step of cutting two slots in the base of the channel yoke to define three bridges one adjacent the other bridging the gap between the leg walls of the yoke. The channel yoke is then inserted into the notch-like cut-out of the shaft so as to cause the channel yoke to engage the annular wall of the shaft in the slots at the bottom region of the cut-out. In this way, the center bridge of the channel is disposed between the inner walls of the shaft. The channel yoke is then brazed to the shaft at the interface between the channel yoke and the shaft.

4 Claims, 14 Drawing Figures

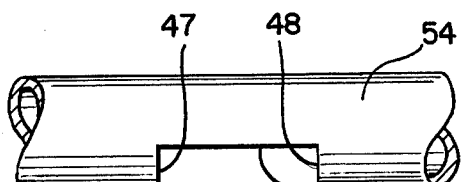
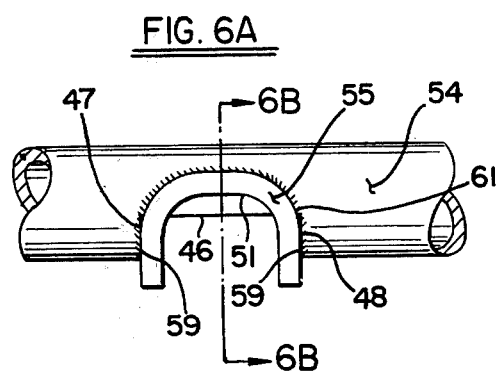
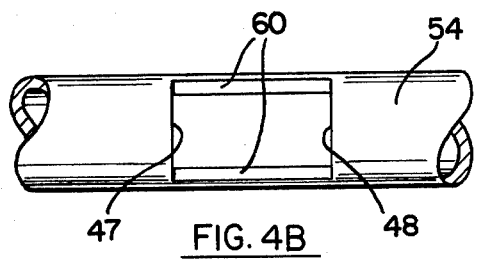
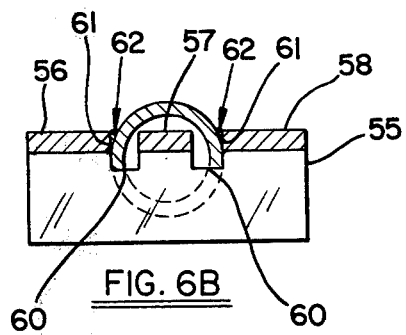
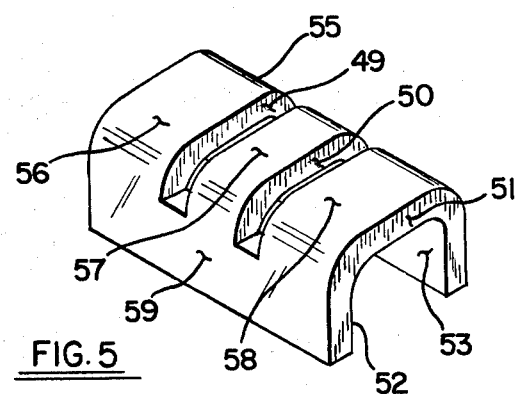
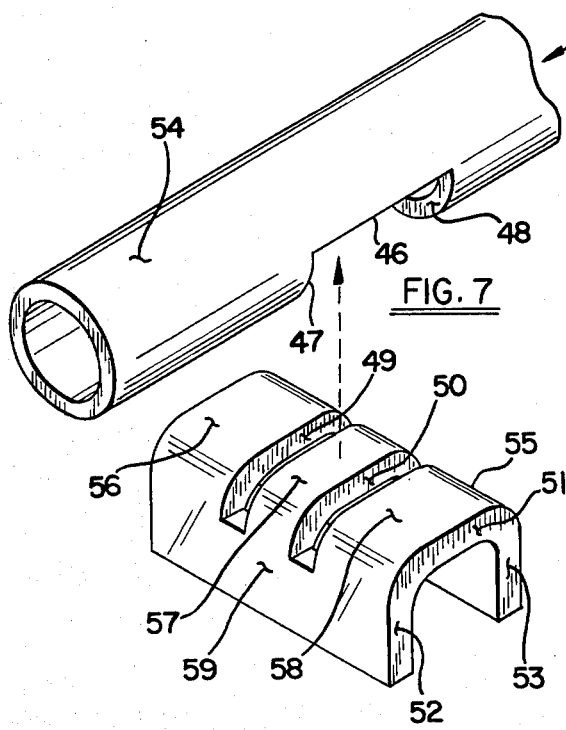
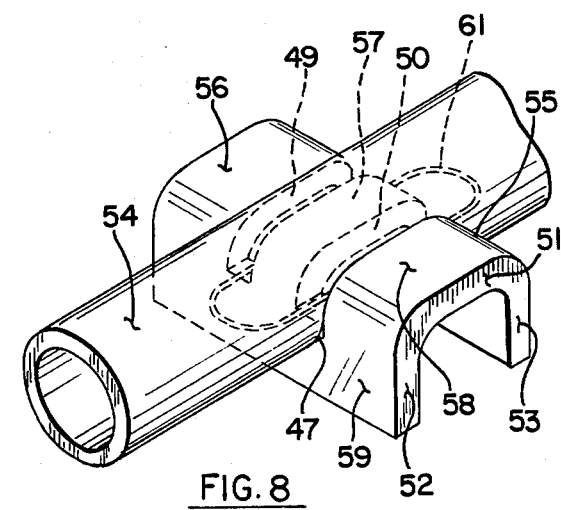

POWER DRIVEN TOOL HAVING A RECIPROCATING SHAFT ARRANGEMENT AND METHOD OF ASSEMBLY

BACKGROUND OF THE INVENTION

The instant invention relates to power driven tools for reciprocating a cutting element such as a saw blade or the like. Such tools usually include some kind of shaft arrangement mounted in the gear case of the tool. The shaft arrangement will include a shaft slideably mounted in the gear case for reciprocating movement. The shaft is adapted to receive the cutting element thereon. A U-shaped channel yoke is mounted to the shaft for coacting with an eccentric drive driven by the motor of the power tool. The eccentric drive includes a pin and bearing which engages the U-shaped channel yoke and reciprocates the shaft arrangement during operation of the tool.

It is highly desirable for this shaft arrangement to have a minimal mass and yet be sufficiently strong that it can stand up well during the heavy-duty operations to which it is subjected when cutting work such as lumber, steel and the like.

A typical arrangement of the prior art includes an annular shaft having a notch-like cut-out formed therein for accommodating the U-shaped channel yoke. The manufacturing tolerances of the notch-like cut-out in the shaft and of the channel yoke have to be kept within defined limits so that a reliable brazed joint is obtained between the U-shaped channel yoke and the shaft. A good brazed joint is essential in this arrangement because brazed joint must transmit the entire reciprocating drive force from the yoke to the shaft. Maintaining the close tolerances for the yoke has proven in practice to be very expensive because of relatively large material thickness and forming tolerances. For example, a small bend radius has to be provided for the U-shaped channel yoke where the leg portions of the yoke join the base of the yoke. Otherwise, the notch-like cut-out in the shaft will have to be of excessive depth thereby weakening the shaft.

Also, it has been shown that a small bend radius in a channel yoke contributes to weakness of the yoke. Whereas, a large bending radius is desirable because the bending operation performed to manufacture the U-shaped channel yoke will not cause adverse stress concentrations in the material and not appreciably weaken the channel yoke. Although extrusion of steel would appear to afford a possible means of manufacturing a channel yoke with a narrow bend radius, it has been impractical to do so for the dimensions required in the channel yoke of a reciprocating power tool.

In addition, in order to hold the parts together during brazing, a rivet is often utilized to hold the yoke to the shaft as the brazing joint is formed. The hole made in the shaft for accommodating the rivet further weakens the shaft at the exact point where the shaft has already been weakened by the cut-out required to accommodate the channel yoke.

The above requirements make it necessary to use a shaft of heavy material to afford the necessary strength needed to compensate for the weakened structure at the yoke-shaft interface. This add to the discomfort of the operator because a larger mass must be reciprocated by the eccentric drive thereby imparting vibrations to the housing of the tool and to the tool operator.

The prior art shaft arrangement also required a clean up operation after the brazing step had been performed. Brazing material will inevitably run from the joint region over the surface of the shaft. Since the shaft wall constitutes a bearing surface it must be clean and well polished. Accordingly a clean-up step for removing excessive brazing must also be performed.

SUMMARY OF THE INVENTION

In view of the foregoing it is an object of my invention to reduce the reciprocating mass of the shaft arrangement in power driven tools for reciprocating a cutting element such as a saw blade or the like and thereby increase operator comfort and the life of the tool.

It is another object of my invention to provide a shaft arrangement for such a tool which is inexpensive to manufacture. It is still another object of my invention to provide a shaft arrangement which affords increased strength at the joint of the shaft and channel yoke. It is a further object of my invention to provide a shaft arrangement which lends itself to easy manufacture and which can be assembled with a minimal number of steps.

A power tool for reciprocating a cutting element such as a saw blade or the like includes a motor housing and drive means mounted in the motor housing. A gear case is connected to the motor housing and a shaft arrangement is mounted in this gear case. The shaft arrangement includes a shaft slideably mounted in the gear case for reciprocating movement. The shaft is adapted to receive the cutting element thereon. A U-shaped channel yoke also constitutes part of the shaft arrangement. According to a feature of my invention, notch means are formed in the U-shaped channel yoke for engaging the shaft therein. An eccentric means is arranged in the gear case and connects the drive means to the U-shaped channel yoke for reciprocating the shaft arrangement.

With the aid of notch means formed in the channel yoke, lateral support is imparted to the yoke by the outside walls of the shaft. The lateral support is primarily imparted to the channel yoke at the base of the yoke.

The U-shaped channel yoke has two leg walls and a base mutually connecting the leg walls. The U-shaped channel yoke also has a longitudinal axis parallel to these leg walls and the base. The notch means can be in the form of a notch formed in the channel yoke transversely to the longitudinal axis thereof. The notch preferably extends clear through the base of the channel yoke such that the base defines the sides of the mutually adjacent edges of the notch. The shaft has a U-shaped cut-out formed therein for receiving the channel yoke in such a manner that the leg walls of the channel yoke beneath the notch are adjacent corresponding ones of the side walls of the notch-like cut-out and such that the edges in the base engage the outer wall of the shaft above the cut-out in the shaft. In this way, lateral support is imparted to the U-shaped channel yoke directly by the outer wall of the shaft at the above-mentioned edges in the base of the channel yoke.

The shaft and the yoke conjointly define a common interface and joining means such as a brazed joint join the channel yoke and the shaft at this interface. However, the primary strength at the interface is provided by the direct structural contact of the shaft walls with the channel yoke. The brazed joint adds ancillary structural support.

According to another feature of my invention, the U-shaped channel yoke can be provided with two slots formed therein which extend clear through the base so as to define three bridges one adjacent the other each bridging the gap between the leg walls. The annular shaft can be a tubular member for example and have a notch-like cut-out formed therein for receiving the channel yoke in such a manner that the portions of the leg walls beneath the central bridge are adjacent corresponding ones of the side-wall edges of the notch-like cut-out and such that the channel yoke engages the annular wall of the shaft in the slots at the bottom region of the cut-out whereby the channel yoke is laterally supported at the base of the channel yoke by the wall of the annular shaft.

According to still another feature of the invention, the slots can be cut such that the channel yoke will press-fit engage with the walls of the shaft above the notch-like cut-out thereof. In this way too, the parts themselves provide the primary lateral support for the channel yoke. Ancillary support is then provided by a brazed joint which fills the interface between the channel yoke and the shaft. This construction provides excellent strength characteristics with minimum mass for the shaft arrangement.

According to the method of assembly of my invention, I perform the following steps for assemblying the shaft arrangement, namely: cutting the two slots in the base of the channel yoke to define three bridges one adjacent the other bridging the gap between the leg walls of the channel yoke; inserting the channel yoke into the notch-like cut-out of the shaft so as to cause the channel yoke to engage the annular wall of the shaft in the slots at the bottom region of the cut-out so as to in turn cause the center bridge of the channel yoke to be disposed between the inner walls of the shaft; and, brazing the channel yoke to the shaft at the interface between the channel yoke and the shaft.

According to still another feature of my invention, I augment the above delineated steps by placing a loop of preformed brazing material in the shaft at the region of the notch-like cut-out. When the channel yoke is inserted into the notch-like cut-out of the shaft, the loop of brazing material is located and disposed substantially in surrounding relation to the center bridge. When the shaft and channel yoke are heated the loop of brazing material melts and is caused to flow by capillary action into the interface between the channel and the shaft.

The placement of the loop of brazing material as described above achieves excellent results because there is a close correspondence between the loop preform and the geometry of the interface between the parts to be brazed. The preform when placed in the hollow shaft is located by the center bridge of the U-shaped channel yoke directly at the interface region. Heating the shaft arrangement at the location where the yoke is joined to the shaft causes the brazing material to become liquid and flow into the interface and, by capillary action, the brazing material reaches the region between the shaft outer surface and the two outer bridges of the yoke. The liquid brazing material also flows into the interface at the sidewalls of the cut-out and the leg portions of the yoke beneath the center bridge. The brazing preform preferably has a substantially rectangular configuration so that it can be accommodated on the center bridge. When the shaft is of round configuration, the gap between the outer surface of the shaft and the outer bridges is substantially wedge-shaped receives the brazing material. The gap fills and takes up any excess brazing material so that there is no flow thereof to the outer bearing surface of the shaft thereby precluding an additional clean-up operation and further reducing the cost of manufacture of the shaft arrangement. It is important that the outer surface of the shaft be absolutely clean so that there will be no binding in the bearings holding the shaft for reciprocatory motion in the gear case.

BRIEF DESCRIPTION OF THE DRAWING

The foregoing objects and advantages of my invention will become more apparent in consideration of the detailed description to follow taken in conjunction with the drawing annexed hereto wherein;

FIGS. 4A and 4B are side elevation and plan views, respectively, of a tubular shaft for a shaft arrangement according to a preferred embodiment of my invention;

FIG. 5 is a perspective view of a U-shaped channel yoke for the preferred embodiment of the shaft arrangement of my invention;

FIG. 6A is a side elevation view of the shaft arrangement according to a preferred embodiment of my invention;

FIG. 6B is a front elevation view, in section, taken along line VIB—VIB of FIG. 6A;

FIG. 7 is an assembly view illustrating the method according to my invention;

FIG. 8 is a view of the shaft arrangement according to the preferred embodiment of my invention showing the location of the brazed preform within a tubular shaft and before heat is applied thereto.

DESCRIPTION OF THE PREFERRED EMBODIMENTS OF THE INVENTION

Figure 1:
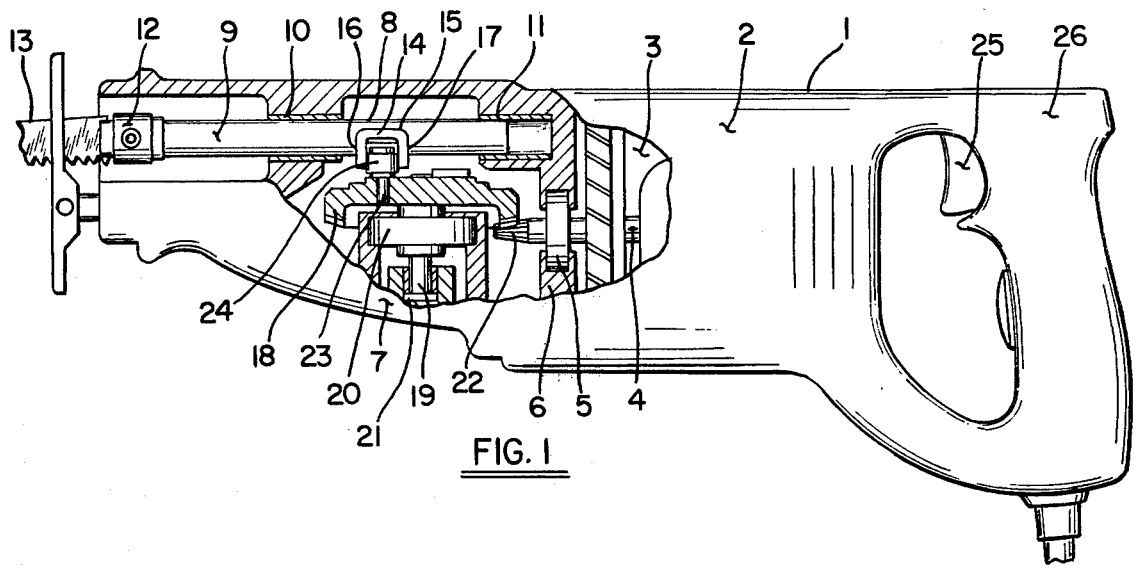
FIG. 1 is an elevation view of a power driven reciprocating saw according to the invention.

Referring to FIG. 1, reference numeral 1 designates a power driven reciprocating saw which includes a motor housing 2 in which an electric drive motor 3 is mounted. The electric drive motor 3 has an armature shaft 4 which is held by means of a bearing 5 in a housing wall 6. The gear case 7 is attached to the motor housing 2 and contains the shaft arrangement. The shaft arrangement is designated by reference numeral 8 and includes a shaft 9 which is preferably tubular. The shaft 9 is held in the gear case with the aid of sleeve bearings 10 and 11 to permit slidable motion in the gear case 7 for reciprocating movement. The shaft arrangement includes a channel yoke 14 having a base 15 and leg walls 16 and 17. A blade clamp 12 for receiving a saw blade 13 therein is provided at the left-hand end of the shaft 9. The blade clamp is the subject matter of my copending U.S. patent application filed on Dec. 6, 1976, having Ser. No. 747,906 and entitled Clamp Arrangement for Clamping Saw Blades to the Blade Holder of a Power Driven Saw.

A crown gear 18 is rotatably mounted within the gear case 7 with the aid of a spindle 19 augmented by bearings 20 and 21. The pinion gear 22 on the shaft 4 engages the crown gear 18 and rotates the same about its spindle 19. A crank pin 23 is eccentrically mounted on top the crown gear 18 and is equipped with a roller 24 which engages the leg walls 16 and 17 of the channel yoke 14 for reciprocating the shaft assembly during operation of the tool. The power driven tool of FIG. 1 also includes a trigger switch 25 and a spadetype handle 26.

The crown gear 18 and pin 23 with roller 24 conjointly define eccentric means connecting the drive motor to the U-shaped channel yoke for reciprocating the shaft arrangement within the gear case 7.

The shaft 9 is preferably tubular as this permits the best operation in sleeve bearings and causes minimum wear. Rotation of the tubular shaft 9 is prevented by a shelf-like protrusion (not shown) within the gear case 7 upon which the channel yoke glides as it reciprocates with the shaft arrangement.

Figure 2A:
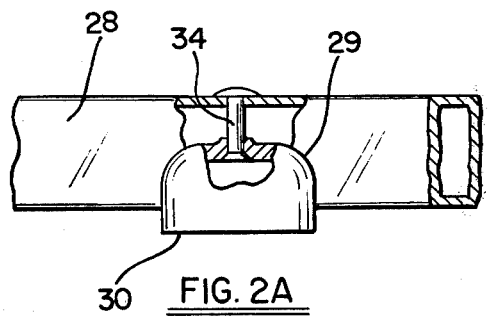
FIG. 2A is an elevation view of a shaft arrangement typical of the prior art arrangements wherein a U-shaped channel yoke is held in a cut-out of a shaft.

FIG. 2A illustrates an arrangement typical of the prior art and includes an annular shaft 28 having a U-shaped cut-out 29 formed therein with the channel yoke 30 received within the cut-out 29.

Attention is called to the fact that the cut-out 29 and the shaft arrangement of FIG. 2A must be cut deep enough into the shaft so that sufficient depth will be provided to support the channel yoke 30 within the cut-out 29. In order to achieve a minimal depth with the configuration shown, it is necessary that the channel yoke 30 be carefully made so that it has a very small curvature at the location thereof where the legs 31 and 32 thereof flow into the base 33. With large radii, additional depth of the cut-out 29 is needed so that a good supporting interface is provided at the side walls of the cut-out and the legs of the channel yoke. Thus, the bending radii and the thickness of the base of the channel yoke all add to the depth of the cut-out 29 required to accommodate the channel yoke 30 in shaft 28. The strength of the shaft can be increased to compensate for a deep cut-out by adding to the mass of the shaft material. However, this makes the shaft heavier and adds to the discomfort of the operator of the tool because of the additional vibration which must inexorably follow from the added weight.

Close tolerances must be maintained between the shaft cut-out 29 and the channel yoke 30 to insure that the channel yoke will fit with precision into the cut-out in the shaft. The notch is a machined surface and the channel yoke would have to be held to the dimension of the cut-out so that a close fit is obtained. This is very important because it is a precondition for a high quality braze. The braze must be of high quality because for this shaft arrangement, the braze itself constitutes the structural interface between the two parts. More specifically, it is the braze which transfers the driving forces from the channel yoke to the reciprocating shaft in response to an eccentrically driven crank pin.

Figure 2B:
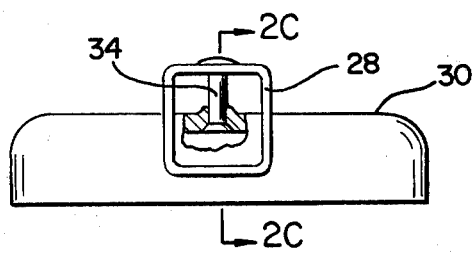
FIG. 2B is a front elevation view of the shaft arrangement according to FIG. 2A.
Figure 2C:
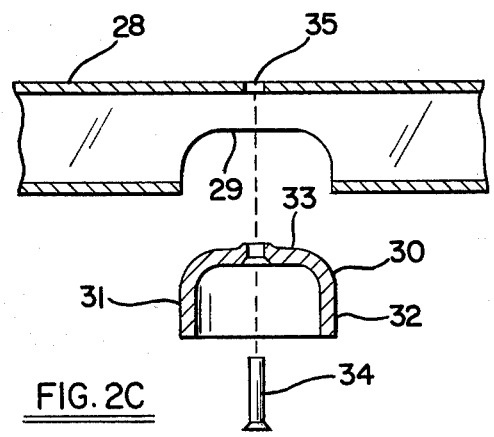
FIG. 2C is an assembly view of the shaft arrangement of FIGS. 2A and 2B with the parts drawn in section and viewed along line IIC—IIC of FIG. 2B.

The rivet 34 shown in FIG. 2C passes through a hole 35 in the top of the shaft 28 to hold the yoke 30 in place during the brazing operation. The hole 35 further weakens the shaft 28 at the very location where it is already weakened by the cut-out 29.

Figure 3A:
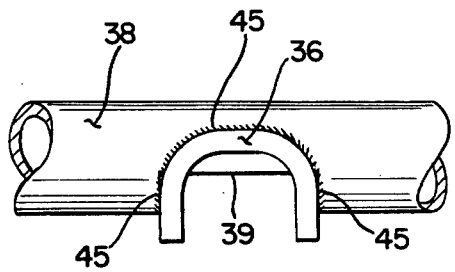
FIG. 3A is a shaft arrangement according to one embodiment of my invention.
Figure 3B:
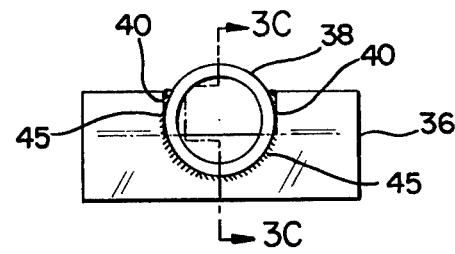
FIG. 3B is a front elevation view of the shaft arrangement according to FIG. 3A.
Figure 3C:
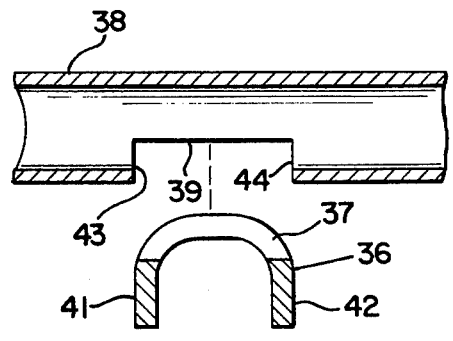
FIG. 3C is an assembly view of FIGS. 3A and 3B the parts of the shaft arrangement drawn in section and viewed along line IIIC—IIIC of FIG. 3B.

FIGS. 3A to 3C show an embodiment of my invention wherein a U-shaped channel yoke 36 is provided with a notch 37. The tubular shaft 38 is provided with a cut-out 39. Attention is called to the fact that the channel yoke 36 has a very large radius of curvature between the legs and base as compared to the configuration shown in FIG. 2A and 2B. This is permissible here because the base of the yoke 36 is above the base portion of the cut-out 39 in the shaft 38. In other words, the cut-out 39 in the shaft 38 of the shaft arrangement according to my invention does not have to be cut to a depth to provide space for the thickness of the base of the yoke and for the space of the bending curvature where the legs of the yoke run into the base. Further, when the channel yoke 36 is pressed onto the shaft 38 a press fit engagement is obtained between the edges 40 and the outer wall of the shaft 38. In this way, the shaft 38 provides lateral support to the base of the channel yoke directly and not through a braze interface. The braze joint 45 shown in FIGS. 3A and 3B augments the structural support provided by the press fit engagement and is ancillary thereto. Accordingly, close tolerances do not have to be provided between the leg walls 41 and 42 of the U-shaped channel yoke 36 because the braze between the side walls edges 43 and 44 of the cut-out and the leg walls 41 and 42 of the channel yoke 36 do not transmit the main portion of the driving force imparted to the shaft arrangement by the crank pin 23 (FIG. 1).

FIG. 4A and 4B and FIG. 5 show the shaft 54 and channel yoke 55 according to a preferred embodiment of the shaft arrangement. The cut-out 46 in the shaft 54 includes side-wall edges 47 and 48. The U-shaped channel yoke 55 shown in FIG. 5 has two slots 49 and 50 formed therein extending clear through the yoke base 51 so as to define three bridges 56, 57 and 58 one adjacent the other. Each of the bridges gap between the leg walls 52 and 53.

The shaft arrangement according to the preferred embodiment of my invention is shown assembled in FIGS. 6A and 6B. The U-shaped cut-out of the tubular shaft 54 receives the channel yoke 55 in such a manner that the leg-wall portions 59 beneath the central bridge 57 are adjacent corresponding ones of the side-wall edges 47 and 48 of the notch-like cut-out 46 and such that the channel yoke engages the tubular shaft 54 in the slots 49 and 50 just above the bottom region 60 of the cut-out so as to cause the channel yoke 55 to be laterally supported at the channel yoke base 51 by the wall of the tubular shaft 54. The shaft 54 and channel yoke 55 thereby conjointly define a common interface. Joining means in the form of a braze 61 augments the structural support afforded by the press-fit engagement of the yoke 55 and shaft 54 at the slots 49 and 50.

Referring to FIG. 6B, the outer bridges 56 and 58 press-fit engage the shaft 54 at location 62 thereby leaving a substantially wedge-shaped opening 61 between the outer wall of shaft 54 and the outer bridges. These substantially wedge-shaped openings are important in performing the method of the invention because they take up excess brazing material when the heating and brazing step of the method according to my invention is performed thereby preventing any excess brazing material from reaching and flowing out over outer wall of the shaft. The outer wall acts as a bearing surface as can be seen in FIG. 1 where the outer wall coacts with the sleeve bearings 10 and 11.

FIG. 7 shows the parts disassembled and in perspective to emphasize how the brazing material can be placed into position for the brazing step. After the two slots 49 and 50 are formed in the yoke 55, the preformed loop of brazing material is placed in the tubular shaft in the region of the notch-like cut-out 46. The channel yoke 55 is then inserted into the notch-like cut-out of the shaft 54 so as to cause the channel yoke 55 to press-fit engage the annular wall of the shaft. The center bridge 57 of the channel yoke 55 is disposed between the inner walls of the shaft and locates and captivates the loop of brazing material so that the same is disposed in substantially surrounding relation to the center bridge 57. In this way, the brazing material is uniformly distributed in the immediate proximity of the interface at which the braze is to be applied. When the shaft arrangement is heated, the braze preform melts and flows to the portions 59 of the legs 52 and 53 of the yoke 55 directly beneath the bridge 57 to form a braze connection between these last-mentioned portions of the legs and the side-wall edges 47 and 48 of the notch-like cut-out 46 in the shaft 54. Also, the liquid brazing material migrates by capillary action into the wedge-shaped openings between the outer bridges 56 and 58 and the outer wall of the shaft. For a braze preform made of brazing wire AMS 4722, the shaft arrangement is heated to approximately 1600° F. Because of the press-fit engagement between shaft and yoke, no other retention means has to be provided to hold these two parts together during the brazing step.

FIG. 9 shows an assembled view of the shaft assembly before the heat is applied and illustrates the preform located and captivated within the shaft 54 when it is positioned around the center bridge 57 of the yoke 55.

I claim:

1. A power driven tool for reciprocating a cutting element such as a saw blade or the like comprising:
    a motor housing;
    drive means mounted in said motor housing;
    a gear case connected to said motor housing;
    a shaft arrangement arranged in said gear case, the shaft arrangement including:
    a U-shaped channel yoke having two leg walls and a base mutually connecting said leg walls, said U-shaped channel yoke also having a longitudinal axis parallel to said leg walls and said base, said U-shaped channel yoke having two slots formed therein extending clear through said base so as to define three bridges one adjacent the other, each of said bridges bridging the gap between said leg walls,
    an annular shaft slidably mounted in said gear case for reciprocating movement and adapted to receive the cutting element thereon, said annular shaft having a U-shaped cut-out formed therein for receiving said channel yoke in such a manner that said leg wall portions beneath the central bridge are adjacent corresponding ones of the side-wall edges of said notch-like cut-out and such that said channel yoke engages said annular wall in said slots at the bottom region of said cut-out whereby said channel yoke is laterally supported at said channel yoke base by the wall of said annular shaft, said shaft and said channel yoke thereby conjointly defining a common interface, and
    joining means for tightly joining said channel yoke and said shaft at said interface; and,
    eccentric means arranged in said gear case connecting said drive means to said U-shaped channel yoke for reciprocating said shaft arrangement.

2. The power driven tool of claim 1, said shaft being tubular and said joining means being a brazed joint.

3. In a power driven tool having a gear case and a motor driven reciprocating shaft arrangement arranged in the gear case for reciprocating a cutting element such as a saw-blade or the like, the shaft arrangement comprising:
    a shaft slideably mounted in the gear case for reciprocating movement and adapted to receive the cutting element thereon;
    a U-shaped channel yoke; and,
    notch means formed in said U-shaped channel yoke for engaging said shaft therein;
    said U-shaped channel yoke having two leg walls and a base mutually connecting said leg walls, said U-shaped channel also having a longitudinal axis parallel to said leg walls and said base, said notch means being two slots formed in said base so as to define three bridges one adjacent the other each bridging the gap between said leg walls;
    said annular shaft having a U-shaped cut-out formed therein for receiving said channel yoke in such a manner that said leg wall portions beneath the central bridge are adjacent corresponding ones of the side-wall edges of said notch-like cut-out and such that said channel yoke engages said annular wall in said slots at the bottom region of said cut-out whereby said channel yoke is laterally supported at said channel yoke base by the wall of said annular shaft, said shaft and said channel yoke thereby conjointly defining a common interface; and,
    fusion joining means for tightly joining said channel yoke and said shaft at said interface.

4. In the power driven tool of claim 3, said fusion joining means being a brazed joint.

* * * * *